Patented Sept. 8, 1953

2,651,657

UNITED STATES PATENT OFFICE 2,651,657

SYNTHETIC LUBRICATING OIL

Louis A. Mikeska, Westfield, and Lawrence T. Eby, Linden, N. J., assignors to Standard Oil Development Company, a corporation of Delaware No Drawing. Application May 21, 1949,
Serial No. 94,748

3 Claims. (Cl. 260—463)

This invention relates to a new class of compounds which have been found to be particularly suitable for use as synthetic lubricants because of their low pour points and high viscosity indices.

In the lubricant art, considerable progress has been realized in recent years in the production of lubricants characterized by one or more specific properties and adapted for particular uses. In the main, this progress can be attributed to two developments: the first, new refining procedures, and the second, addition agents capable of imparting particular properties to available lubricants. Thus, viscosity index improvers and pour depressants are added to automotive lubricants to render the lubricants more adaptable to wide changes in temperature conditions, while other agents are added to improve the load carrying properties of a lubricant which is to be employed, for example, under extreme pressure conditions.

Recently, in an effort to obtain superior lubricants endowed with specific and superior characteristics, a new field has been explored, namely the synthesis of lubricants from various materials. Esters represent one class of materials which have attracted unusual interest as synthetic lubricants.

In general, they are characterized by higher viscosity indices and lower pour points than mineral oils of corresponding viscosity. The esters described in the present specification have been found to exhibit very low pour points and high viscosity indices. Lubricants possessing such properties are of special value in the lubrication of engines which are subjected to high temperatures such as combustion turbine engines, particularly those of the "prop-jet" type. Mineral oil lubricants containing added viscosity index improvers, thickeners or other highly non-volatile ash forming additives are undesirable for use in such engines because of the tendency to leave a residue which accumulates and interferes with the operation of the engine. A synthetic lubricant of the type described in the present specification is especially adapted to use under such conditions, since the lubricant contains no additives and thus tends to leave no residue upon volatilization.

It is known that polyether-alcohols can be prepared from a hydroxy organic compound and a large molar excess of propylene oxide, and that these alcohols and esters derived from them are useful as lubricants. Highly viscous oils may be obtained when such esters are prepared from dicarboxylic acids, since long chain compounds may thus be produced. Since a considerable proportion of the hydroxyl groups in these polyether-alcohols derived from propylene oxide are of the secondary type, the esters thereof are somewhat easily pyrolyzed at elevated temperatures. The pyrolysis liberates an organic acid which is corrosive to metal parts, and the use of such lubricants is accordingly limited.

It has been found, in accordance with the present invention, that carbonate or thiocarbonate esters of ether-alcohols and of ether-glycols, conveniently prepared from a hydroxy compound and propylene oxide, possess the desirable properties of the ether-alcohol or ether-glycol esters as lubricants. The carbonate esters have the advantage in that pyrolysis of the same does not liberate a corrosive organic acid but rather a harmless gas, carbon dioxide. These carbonate or thiocarbonate esters may be prepared readily by reacting an ether-alcohol or ether-glycol with phosgene or thiophosgene, respectively, in the presence of an organic base such as pyridine, or by ester interchange of the hydroxy compound and a lower carbonate or thiocarbonate ester, e. g., diethyl carbonate.

Although a glycol containing one or more ether groups may be employed in preparing the carbonate or thiocarbonate esters of the present invention, the products prepared from ether-alcohols, which contain no free hydroxyl groups after esterification, are much preferred. Such ether-alcohols are conveniently prepared from monohydric aliphatic alcohols by reacting the latter with an alkylene oxide, e. g., propylene oxide, butylene oxide, butadiene monoxide, or tetrahydrofurane, usually by reacting several mols of alkylene oxide with one mol of the alcohol, whereby compounds containing one or more oxygen atoms in ether groupings may be obtained. Products may likewise be prepared from ethylene oxide, but such products contain only $-CH_2-$ groups between the oxygen atoms or between the hydroxyl group and the nearest oxygen atom, and it has been found that if the ratio of groups of the type $-CH_2-CH_2-$ ... to similar groups in which at least one of the hydrogen atoms is replaced by a hydrocarbon group is greater than 3:1, the products may tend to be solid or waxy rather than fluid and tend to have increased water solubility. Accordingly, in the preparation of the ether-alcohols which are to be converted to carbonates or thiocarbonates in accordance with the present invention it is permissible to use ethylene oxide only to a limited extent and only in admixture with a higher alkylene oxide.

More specifically, the hydroxy organic compound which may be employed to form the carbonate or thiocarbonate esters of the present invention is a compound of the formula XROH, where X is hydrogen or a hydroxyl group and R is an organic group consisting of a series of aliphatic hydrocarbon groups, whether saturated or unsaturated, straight chain or branched, interlinked by two to twenty-five oxygen atoms, each pair of oxygen atoms in the molecule being separated by a chain of at least two carbon atoms, the average ratio of all such hydrocarbon groups in the molecule which are of the type —CH₂—CH₂— ... to similar groups in which at least one of the hydrogen atoms is replaced by a hydrocarbon radical being not greater than 3:1, the total number of carbon atoms in the entire R group being from 3 to 85. The hydroxy compound of the type described above may be reacted with phosgene or thiophosgene to form a carbonate or thiocarbonate, which may be defined by the formula

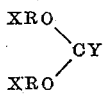

in which X and R have the meanings given above and Y is oxygen or sulfur.

A preferred type of hydroxy-ether compound which may be converted into a carbonate or thiocarbonate having highly desirable lubricant properties is a compound prepared by reacting a saturated monohydroxy aliphatic alcohol containing one to twenty carbon atoms with propylene oxide, butylene oxide, or butadiene monoxide in ratios of two to twenty molecular proportions of the alkylene oxide to one molecular proportion of the alcohol. When such a compound is converted into the carbonate or thiocarbonate, the resulting ester is defined by the formula

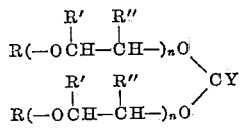

where R is a saturated aliphatic hydrocarbon group containing one to twenty carbon atoms, R' and R'' represent hydrogen, CH₃, C₂H₅ or CH₂=CH, at least one of the R' and R'' symbols representing a hydrocarbon group, where Y represents oxygen or sulfur, and $n$ is an integer from two to twenty. A preferred group of products is defined when R represents a $C_1$ to $C_{10}$ group and when $n$ is eight to twenty, since alcohols of the $C_1$ to $C_{10}$ range are more readily produced and are available commercially, and with this range of alcohols the most suitable proportions of alkylene oxide are from eight to twenty mols per mol of alcohol.

It will be understood that when propylene oxide or a higher alkylene oxide is reacted with a hydroxy compound, the product will consist of a mixture in which the molecules contain the following typical structures:

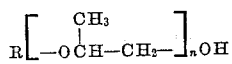

and

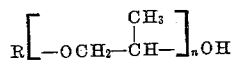

where R is an alkyl group and $n$ represents the mol ratio of alkylene oxide to the alcohol; but such mixed products are equally as suitable as products of a single molecular structure in preparing the esters of the present invention.

Many of the ether-alcohols of the type described above are known in the industry as "Dowanols," "Carbitols," or "Cellosolves."

The various components of the carbonate esters of the present invention should be chosen so that the molecular weight of the final product is at least 300, but the product should not have a viscosity greater than 40 centistokes at 210° F., to provide a product having lubricating properties.

Typical examples of ether-alcohols which may be employed in the formation of carbonate and thiocarbonate esters in accordance with the present invention are the following:

Propylene glycol mono-n-dodecyl thioether
Propylene glycol mono-n-butyl ether
Dipropylene glycol monomethyl ether
Dipropylene glycol monoethyl ether
Dipropylene glycol mono-n-butyl ether
Tripropylene glycol monomethyl ether
Tripropylene glycol monoethyl ether
Tripropylene glycol mono-n-butyl ether
Propylene glycol monoisopropyl ether
Dipropylene glycol monoisopropyl ether
Tripropylene glycol monoisopropyl ether
Dipropylene glycol mono-tert.-octyl thioether
Tripropylene glycol mono-tert.-octyl thioether
Tetrapropylene glycol mono-tert.-octyl thioether Typical ether-glycols which may likewise be employed in the formation of carbonate and thiocarbonate esters are the polypropylene glycols of the general formula

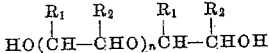

where $R_1$ or $R_2$ is a methyl group and the other is hydrogen, and where $n$ is one to twenty. Viscous oils may be prepared by employing more than one but not more than two mols of phosgene or thiophosgene for each two mols of polyether-glycol in the esterification reaction, whereby long chain compounds are produced.

When the carbonates or thiocarbonates are formed by the reaction of the ether-alcohol or polyether-glycol with phosgene or thiophosgene, respectively, it is desirable to conduct the reaction in the presence of a sufficient amount of an organic base, such as pyridine, to absorb the hydrogen chloride formed in the reaction as a hydrochloride of the base. This hydrochloride is separated from the ester reaction product in the final steps of the process.

The carbonate and thiocarbonate esters of the present invention may be used as lubricants with or without other additives. Minor portions of antioxidants such as phenyl-α-naphthylamine improve the stability of the oils. Detergent type additives may be incorporated for special types of service, as in the crankcase of a diesel engine. The oils may be used in grease compositions and they may be blended with other oils, either of similar or dissimilar organic structure, such as mineral oils.

The preparations of ether-alcohols and the carbonate esters thereof are shown in the following examples, which are given by way of illustration only and are not to be considered as limiting the scope of the invention in any manner.

*Example 1*

A one-liter flask equipped with stirrer, return condenser, thermometer, dropping funnel and gas inlet tube was charged with 37.1 g. (0.5 mol) of n-butyl alcohol. Five grams of boron fluoride-ethyl ether (equivalent to 0.033 mol of boron fluoride) was added, after which 406.6 grams (7.0 mols) of propylene oxide was added over a period of 2¾ hours while keeping the temperature between 25 and 30° C. The mixture was stirred for an additional hour whereupon it was diluted with ether and washed with sodium bicarbonate aqueous solution. The ether solution was dried over anhydrous potassium carbonate, filtered and stripped of ether and volatile products in a Claisen flask heated up to 200° C. at 1 mm. Hg pressure. The colorless oil obtained as a residue weighed 388.3 grams (87.5% yield) and analyzed as follows: 62.14% carbon, 10.76% hydrogen, (27.10% oxygen by difference), acetyl number=111.2 mg. KOH/gram or equivalent weight per hydroxyl group of 504, kinematic viscosity=5.89 cs./210° F. and 33.56 cs./100° F. (128.4 V. I. or 0.702 ASTM slope). Since this oil was made with ordinary grade reagents without special drying, it probably consists of both the polyether-alcohol and the polyether-glycol, the latter being present in an amount not greater than 20% by weight of the whole product.

A round bottom flask equipped with a fractionating column was charged with 40.32 grams of the product prepared as described above and 4.72 grams of diethyl carbonate. To this was added 100 cc. of toluene and a pinch of sodium methoxide. The mixture was distilled with a high reflux ratio and a distillate taken overhead at 88 to 95° C. The distillation was continued until the overhead distillate reached 110° C., after which the residue was cooled, poured into water, acidified with hydrochloric acid, washed and dried over anhydrous sodium sulfate. The oil was stripped to 200° C. at 2 mm. Hg pressure. The product analyzed as follows: 61.11% carbon, 10.60% hydrogen, acetyl number=17.9 mg. KOH/grams, saponification number=74.3 mg. KOH/gram, kinematic viscosity=12.07 cs./210° F. and 72.86 cs. at 100° F. (141.6 V. I. or 0.588 ASTM slope).

*Example 2*

A 500 ml. four-necked, round bottom flask equipped with a stirrer, return condenser, thermometer, dropping funnel and gas inlet tube was dried over a hot plate with a stream of dry nitrogen for 2 hours. After cooling to room temperature 29.6 grams (0.4 mol) of n-butyl alcohol was added to the flask. The n-butyl alcohol had been distilled from sodium for special drying. Gaseous boron fluoride (1400 cc. or 0.06 mol) was absorbed in the n-butyl alcohol with cooling, after which 393 ml. (325.2 grams or 5.6 mols) of propylene oxide was added dropwise over a period of two hours while the reaction temperature was kept between 25 and 30° C. After an additional hour of stirring ether was added and the mixture washed with 80 ml. of saturated aqueous sodium bicarbonate solution. The ether layer was dried over anhydrous potassium carbonate, filtered and stripped of solvent and volatile constituents in a Claisen flask up to 200° C. at 1 mm. Hg pressure. The residue was a light yellow oil weighing 331.0 grams (93.3% yield) and having the following analysis: 61.28% carbon, 10.64% hydrogen (28.08% oxygen by difference), acetyl number=73 mg. KOH/gram or equivalent weight per hydroxyl group of 768, kinematic viscosity=7.41 centistokes at 210° F. and 41.08 centistokes at 100° F. (141.1 V. I. or 0.643 ASTM slope).

A 200 ml. Erlenmeyer flask equipped with a thermometer and a calcium chloride drying tube was charged with 41.0 grams of the polyether-alcohol prepared as described above (0.05 mol) and 7.9 grams (0.1 mol) of pyridine (reagent grade dried over potassium hydroxide). There was slowly added 33.3 ml. of a toluene solution containing 0.025 mol of phosgene. The temperature rose from 24.5 to 51° C. The clear light yellow oil turned to a milky white mixture. The mixture was allowed to stand four days at room temperature after which it was poured into aqueous sodium bicarbonate and extracted with ether. The ether layer was dried over anhydrous potassium carbonate, filtered and stripped of volatile constituents in a Claisen flask up to 200° C. at 1 mm. Hg pressure. The residue was a yellow oil weighing 41.7 grams and having the following analysis: 60.69% carbon, 10.28% hydrogen (29.03% oxygen by difference), acetyl number= 16.7 mg. KOH per gram, saponification number=30.9 mg. KOH/gram, neutralization number=0.64 mg. KOH per gram, kinematic viscosity=14.83 centistokes at 210° F. and 89.20 centistokes at 100° F. (142.8 V. I. or 0.548 ASTM slope), and ASTM pour point was below −35° F.

The above data indicate that the esters constituting the subject matter of the present invention possess characteristics, particularly with regard to viscosity index and pour point, which indicate their suitability for general use as lubricating oils and particularly for use where the use of additives is not desirable.

What is claimed is:

1. As a new composition of matter a compound of the formula—

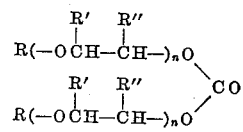

where R is an alkyl group containing 1 to 10 carbon atoms, R' and R'' are members of the group consisting of hydrogen and methyl groups, one being hydrogen and the other a methyl group in each radical, and $n$ is an integer from 8 to 20, said composition of material having a molecular weight of at least 300 and a viscosity less than 40 centistokes at 210° F.

2. A composition according to claim 1 in which R is a normal butyl radical.

3. A composition according to claim 2 in which $n$ is 14.

LOUIS A. MIKESKA.
LAWRENCE T. EBY.

References Cited in the file of this patent

UNITED STATES PATENTS

| Number | Name | Date |
|---|---|---|
| 2,153,137 | Dickey | Apr. 4, 1939 |
| 2,379,252 | Muskat | June 26, 1945 |
| 2,381,511 | Muskat | Aug. 7, 1945 |
| 2,476,637 | Strain | July 19, 1949 |
| 2,520,733 | Morris et al. | Aug. 29, 1950 |

FOREIGN PATENTS

| Number | Country | Date |
|---|---|---|
| 459,311 | Germany | May 1, 1928 |

OTHER REFERENCES

Drake and Carter, J. A. C. S., vol. 52, pp. 3720–3724.

Chemistry of Pet. Derivatives, by Ellis, pp. 528–529.